(12) United States Patent
Sparrer

(10) Patent No.: US 6,565,138 B2
(45) Date of Patent: May 20, 2003

(54) SEATING ARRANGEMENT FOR A VEHICLE INTERIOR

(75) Inventor: Henning Sparrer, Notzingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/147,412

(22) Filed: May 16, 2002

(65) Prior Publication Data

US 2002/0175532 A1 Nov. 28, 2002

(30) Foreign Application Priority Data

May 18, 2001 (DE) .......................... 101 25 727

(51) Int. Cl.$^7$ ................................ B60N 2/02
(52) U.S. Cl. ...................... 296/65.01; 296/63
(58) Field of Search .................. 296/37.1, 37.16, 296/63, 66, 67, 65.05, 65.11, 65.13, 65.16, 107.08

(56) References Cited

U.S. PATENT DOCUMENTS

| 3,011,822 A | * | 12/1961 | May et al. ............... 296/66 |
| 4,198,091 A | * | 4/1980 | Appleton ............... 296/37.16 |
| 4,848,826 A | * | 7/1989 | Kuwabara et al. ....... 296/37.16 |
| 5,322,335 A | * | 6/1994 | Niemi ................... 296/39.1 |
| 5,658,046 A | * | 8/1997 | Rus ....................... 296/66 |
| 5,702,145 A | * | 12/1997 | Fowler et al. ........... 296/66 |
| 5,716,091 A | * | 2/1998 | Wieczorek ............. 296/37.16 |
| 6,155,621 A | * | 12/2000 | Nishida et al. ......... 296/37.16 |
| 6,283,533 B1 | * | 9/2001 | Gavin .................. 296/107.08 |

FOREIGN PATENT DOCUMENTS

| DE | 37 29 837 A1 | 3/1989 | ........ B62D/31/00 |
| DE | 198 11 884 A1 | 9/1999 | ........ B60J/1/18 |
| DE | 199 35 510 A1 | 1/2001 | ........ B60R/7/08 |
| EP | 0 857 614 A2 | 8/1998 | ........ B60R/5/04 |
| FR | 2 710 595 A1 | 4/1995 | ........ B60R/5/04 |
| FR | 2 752 785 A1 | 3/1998 | ........ B60N/3/00 |

* cited by examiner

Primary Examiner—Stephen T. Gordon
Assistant Examiner—Jason Morrow
(74) Attorney, Agent, or Firm—Greenberg Traurig, P.C.

(57) ABSTRACT

At least one screen apparatus is attached, on the one hand, to the seatback and, on the other hand, to the wall of the vehicle body, and is flexible in form, in order to permit the movement of the seatback, and which is rigid in form to retain its shape.

5 Claims, 2 Drawing Sheets

SEATING ARRANGEMENT FOR A VEHICLE INTERIOR

BACKGROUND OF THE DISCLOSURE

1. Field of the Invention

The invention concerns a seating arrangement for a vehicle interior with at least one seatback which is adjacent to a wall of the vehicle body, whereby at least the seatback is adjustable relative to the wall of the vehicle body.

2. Background Art

Fashioning a seating arrangement in the area of a rear compartment in an adjustable fashion is generally known in passenger vehicles of the upper or luxury classes. In the process the upper area of the seatback of the seating arrangement is set against a rear wall of the vehicle interior so that bringing the seat cushion forward also inevitably leads to an increased slanting position, i.e. the decrease of the inclination of the seatback.

The task of the invention is to create a seating arrangement of the sort mentioned at the onset, which ensures improved adjustability as compared to the current state of the art.

SUMMARY OF THE INVENTION

This task will be solved thereby in that at least one screen apparatus is provided which is attached to the seatback, on the one hand, and to the wall of the vehicle body, on the other hand, and which is of a flexible form in order to permit movement of the seatback, and which is of a intrinsically rigid form in order at least to retain its shape during the movement of the seatback as far as possible. Through the solution according to the invention, the positioning of the seatback against the wall of the vehicle body, as is the case with the current state of the art, is no longer necessary. Rather, an extremely variable adjustability of the seating arrangement is ensured, in which the seat arrangement can be adjusted in the vehicie's longitudinal direction and in an up and down direction and furthermore the seatback can be placed in its folded down position since the seating arrangement no longer requires attachment to the wall of the vehicle body. The screen apparatus ensures that the distance or space between the seatback and the wall of the vehicle body according to the position of the seating arrangement is covered in every instance. As a result, the gap or space between the wall of the vehicle body and the seatback can be kept clean of dirt. A visually attractive and high-quality impression arises through the rigid construction of the screen apparatus, which furthermore can offer storage possibilities, for example, in extending an area for hats towards the front. This can occur as a result of the movement of the seatback and the seating arrangement by means of the flexible construction of the screen apparatus. The seating arrangement can be comprised of one or several individual seats or also of one bench. The seating arrangement according to the invention is especially preferable in the rear area of the interior of a passenger vehicle.

In the embodiment of the invention, the screen apparatus has several dimensionally-stable slats which are overlapped one over the other in a parallel fashion over flexible coupling segments. These slats extend when an adjustment occurs in the seating arrangement in a rear area of a passenger vehicle mainly in a direction perpendicular to the vehicle, i.e. they are lined up horizontally. The flexible coupling segments can be fashioned of hinges with dimensionally-stable hinge elements or also of an elastic hinge configuration.

In a further embodiment of the invention, the screen apparatus is connected on one side with a dimensionally-stable adapter that can be mounted on the wall of the vehicle body or the seat. Simple and removable installation is achieved through this. Prior assembly of the screen apparatus is possible by means of the adapter so that the positioning of the screen apparatus on the seating arrangement and on the wall of the vehicle body can be achieved with relatively low assembly cost.

In a further embodiment of the invention, the screen apparatus is mounted curved between the wall of the vehicle body and the seatback. By means of the preferably upward-curving orientation or downward-curving orientation of the screen apparatus, a defined outwards bend or crease of the screen apparatus is ensured upon the adjustment of the seating arrangement. By means of the curvature, the desired direction of the displacement of the screen apparatus is already preset when pressed together. The extension lengthwise of the screen apparatus—in relation to the width of the gap or the space—is thus selected so that the screen apparatus is also not stretched out in the most extended position when the seating arrangement is adjusted, so that the screen apparatus is not exposed to tension, so that no recoil forces act upon the seat arrangement because of the mounting of the screen apparatus.

Further advantages and points of interest of the invention are presented in the claims as well as the following description of a preferred example of implementation of the invention, which is depicted in the drawings.

DETAILED DESCRIPTION OF THE DRAWINGS

Figure 1:
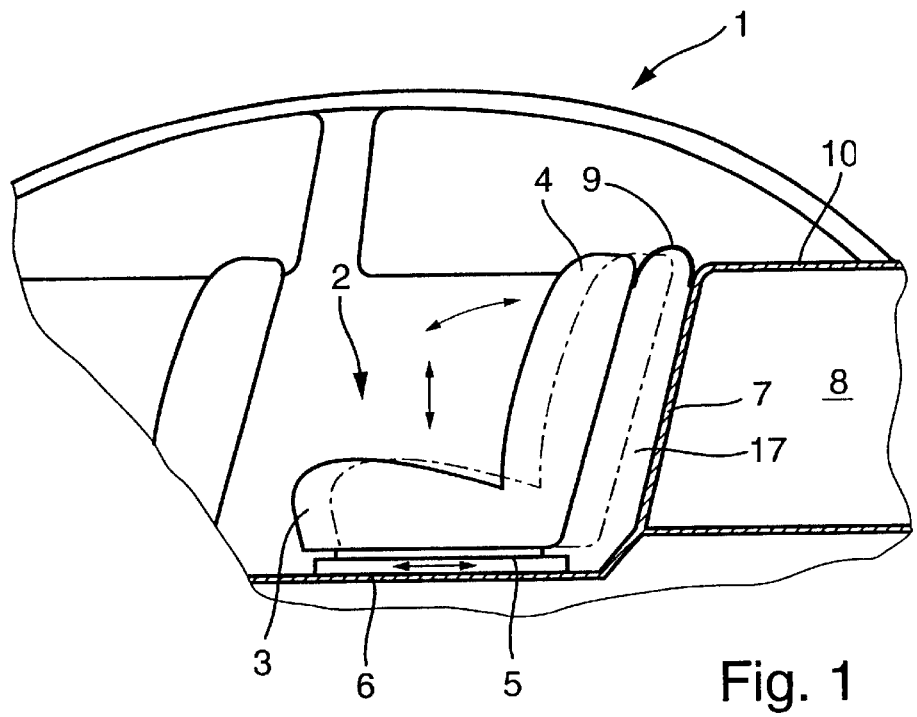
FIG. 1 schematically shows in a cross-sectional view an implementation of a seating arrangement in a rear area of a passenger vehicle according to the invention.

While this invention is susceptible of embodiment in many different forms, there is shown in the drawings, and will be described in detail herein, one specific embodiment, with the understanding that the present embodiment is to be considered as an exemplification of the principles of the invention and is not intended to limit the invention to the embodiments illustrated.

A passenger vehicle 1 has, according to FIG. 1, a vehicle interior which is also provided with a forward area as well as with a rear area 2. In the rear area 2 a seating arrangement 3, 4 is provided, which consists of two individual seats arranged adjacent to each other in the depicted example of implementation, whereby each individual seat has a seat and a seatback. Each individual seat is analogous to a driver or passenger-side seat which can be adjustably set both in the longitudinal direction of the vehicle as well as up and down in relation to the vehicle (see arrows). Additionally, the seatback 4 is infinitely adjustable between an upright position and a folded down position when it is folded down. For the setting and adjustment of each individual seat a guiding and positioning unit 5, 6 is provided, which is merely suggested schematically in FIG. 1, however, corresponds to a guiding or positioning unit for a driver or passenger-side seat in its fundamental structure.

In the space behind the seatback 4 of the individual seat, a rear wall 7 of the vehicle body is provided, which at the same time depicts the front side boundary of a luggage or storage area 8. The luggage or storage area 8 is separated moving upwards by a horizontal portion of the vehicle body, which is generally described as an area for hats. Between the rear of the seatback 4 and the rear wall 7 a space can be found which is variable in its width depending on the position of each individual seat 3, 4. The space 17 is open on top between the upper side of the seatback 4 and the area for hats 10, whereby a screen apparatus 9 is provided to close off this open area. In the depicted example of implementation a screen apparatus is provided in each instance for each individual seat 3, 4, extending over the entire length of each of the spaces 17—as seen in the direction perpendicular to the vehicle—and thus covers each space 17 completely. On the opposing surface of the wall each screen apparatus 9 locks with the interior panel sections, whereby a seating console is provided as an interior panel section in the middle of the vehicle, which separates both individual seats 3, 4 from each other.

Figure 2:
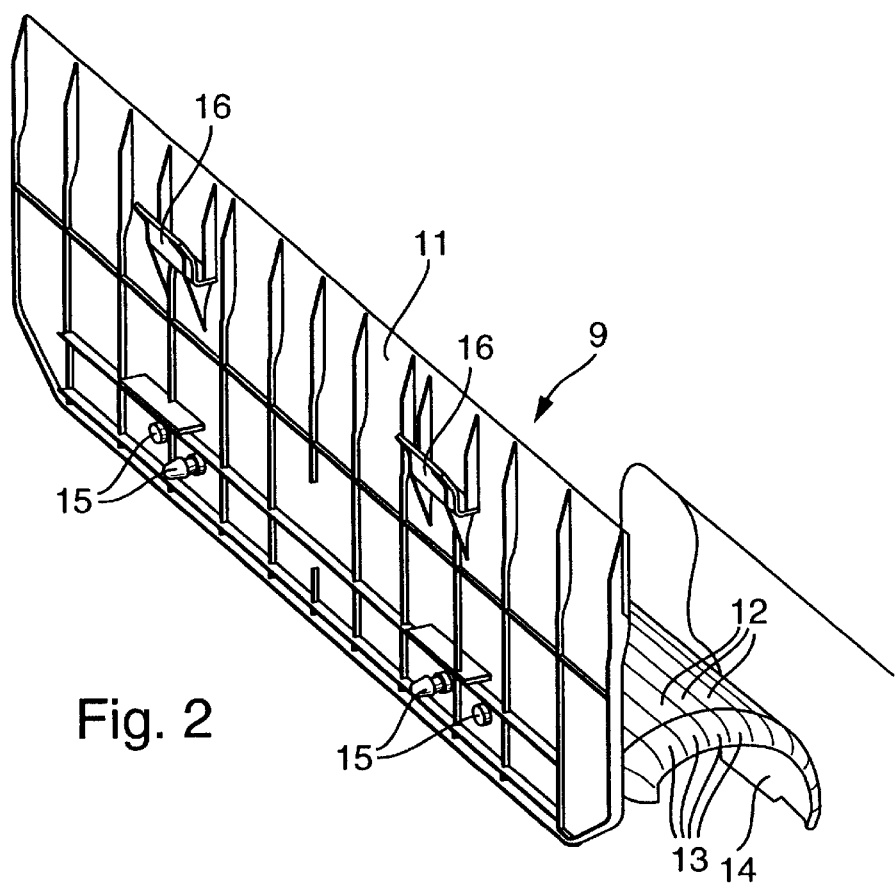
FIG. 2 shows a screen apparatus for the seating arrangement according to FIG. 1 in an enlarged perspective depiction.
Figure 3:
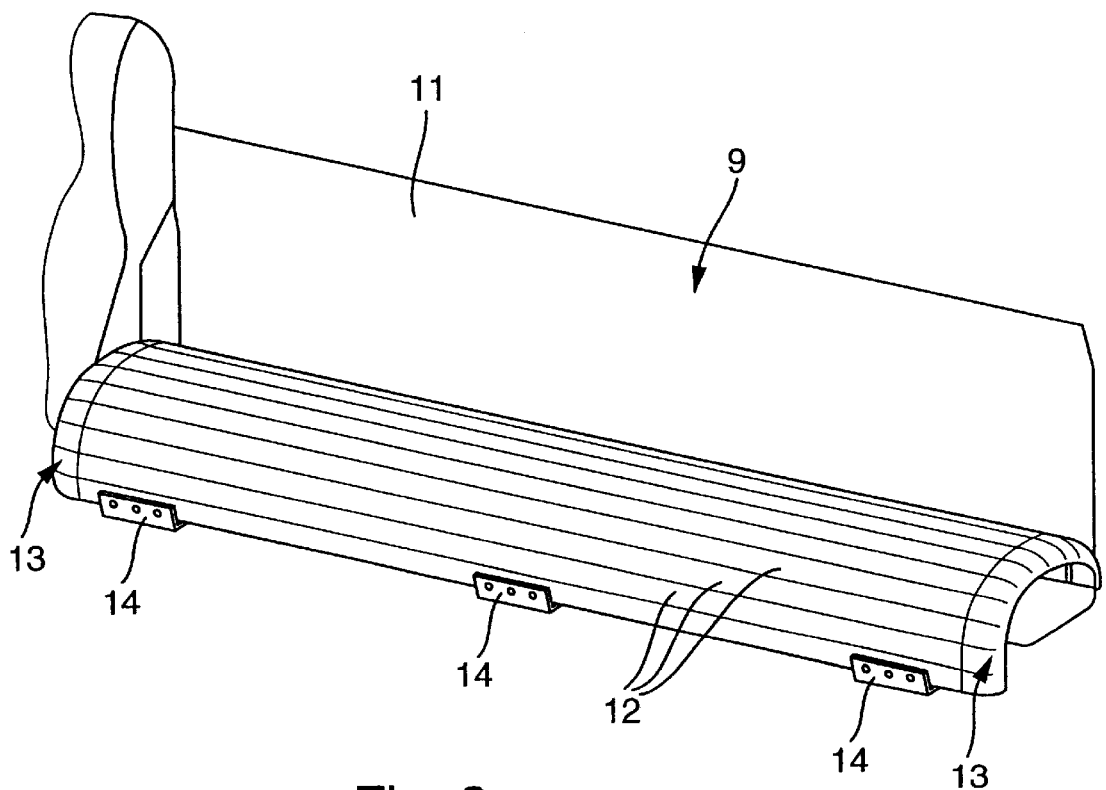
FIG. 3 shows a further perspective depiction of the screen apparatus according to FIG. 2 from the opposing side.

As can be plainly seen in FIGS. 2 and 3, the screen apparatus 9 is assembled from a large number of dimensionally-stable slats 12, arranged parallel to one another horizontally and in a direction perpendicular to the vehicle, which are bound together over flexible coupling segments 13. In the depicted example of implementation, elastic caterpillar segments 13 are provided at the side, which are securely fastened with the surface of the walls of the slats 12. Additionally or alternatively the slats 12 can be securely fastened on their undersides and/or tops with a flexible top layer in the form of a fabric or similar material, which on one hand ensures the close connection between the slats and on the other hand can serve alternatively or additionally as a linking segment.

The screen apparatus is fashioned in such a way that, when in an assembled state, it is inevitably pushed into a state in which it is bent upwards according to FIGS. 1 to 3. The coupling segments 13 are connected in a stretched fashion one under the other in such a way that in the assembled state they inevitably exert the bending pressure upwards on the slats 12, and yet are independent of whichever position in which the individual seats 3, 4 are found. The extended length of the screen apparatus 9 seen in the longitudinal direction of the vehicle is greater than the maximum distance between the rear of the seatback 4 and the rear wall 7 in the longitudinal direction of the vehicle, so that, even in the most forward advanced position of the individual seat 3, 4, the screen apparatus 9 can be found in its upwardly bending position. It is thereby ensured that the screen apparatus 9 bends itself upwards as defined exclusively by moving back the individual seat 3, 4, so that fold or wave formations are avoided.

The screen apparatus 9 is detachably connected with both the rear of the seat back 4 as well as the rear wall 7. For connection to the rear wall 7, a dimensionally-stable adapter 11 is provided, which is provided with insertion guides 16, which combine with a corresponding receiver on the rear wall 7 in an assembled state. Furthermore, the plate-shaped adapter 11 has a means for attachment 15 by means of which the assigned long side of the screen apparatus 9 can be detachably connected with the adapter 11. In addition, the opposing long side of the screen apparatus 9 is provided with the means for attachment 14, which can be detachably connected to the rear of the seatback. Both the adapter 11 as well as the slats 12 are preferably constructed of plastic. The coupling segments 13 can be preferably constructed of an elastomer such as rubber, for example.

The foregoing description and drawings merely explain and illustrate the invention, and the invention is not limited thereto except insofar as the pending claims are so limited, as those skilled in the art and having the present disclosure before them will be able to make modifications and variations therein without departing from the scope of the invention.

What is claimed is:

1. A seat arrangement for an interior of a vehicle, having a passenger compartment area and a segregated cargo area, with at least one seatback which is adjacent to a horizontally extending rear deck of the passenger compartment area, which rear deck separates the passenger compartment area from the cargo area and is vertically spaced above at least a portion of the cargo area, and wherein a vertical space extends between the at least one seatback and the rear deck whereby the seatback at least can be adjusted relative to the rear deck, wherein at least one screen apparatus is provided which spans over the vertical space between the seatback and the rear deck and is secured on the one hand to the seatback (4) and on the other hand to the rear deck, and which is flexible in form in order to permit the movement of the seatback (4), and which is rigid in form in order at least to retain its shape during the movement of the seatback as extensively as possible.

2. The seating arrangement of claim 1, wherein the screen apparatus (9) has several dimensionally-stable slats (12) which are overlapped one over the other in a parallel fashion over at least one flexible coupling segment (13).

3. The seating arrangement of claim 1, wherein the screen apparatus (9) is connected to at least one side with a dimensionally-stable adapter (11), which can be securely attached on the rear deck of the vehicle body or the seat.

4. The seating arrangement of claim 1, wherein it is provided in a rear area (2) of a passenger vehicle.

5. The seating arrangement of claim 1, wherein the screen apparatus (9) is attached in a bent fashion between the rear deck of the vehicle passenger compartment and the seatback (4).

* * * * *